(12) United States Patent
Fox et al.

(10) Patent No.: US 6,857,105 B1
(45) Date of Patent: Feb. 15, 2005

(54) METHOD AND APPARATUS FOR EXPANDING AND CONTRACTING GRAPHICAL FUNCTION DISPLAYS

(75) Inventors: Martin Fox, San Jose, CA (US); Robert McAfee, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 550 days.

(21) Appl. No.: 10/079,739

(22) Filed: Feb. 19, 2002

(51) Int. Cl.[7] ............................................. G06F 13/00
(52) U.S. Cl. ..................................... 715/825; 715/808
(58) Field of Search ............................... 715/711, 808, 715/835, 815, 825, 830

(56) References Cited

U.S. PATENT DOCUMENTS 5,870,091 A    2/1999  Lazarony, Jr. et al.
6,232,972 B1 *  5/2001  Arcuri et al. ............... 345/815
6,438,564 B1 *  8/2002  Morton et al. .............. 715/500

* cited by examiner

*Primary Examiner*—Cao (Kevin) Nguyen
(74) *Attorney, Agent, or Firm*—Fish & Richardson P.C.

(57) ABSTRACT

Methods and apparatus, including computer program products, implementing and using techniques for customizing a graphical function display. In one aspect, the invention features operations to customize a toolbar graphically representing tools including one or more groups of tools. A tool is represented by an icon on the toolbar, and a group of tools is represented by one or more icons on the toolbar. In response to user input, an icon representing a group of tools can be replaced with all or a subset of icons representing tools in the group of tools. Similarly, in response to user input, a plurality of icons representing tools in a group of tools can be replaced with an icon representing the group of tools and can also represent a tool in the group of tools.

40 Claims, 3 Drawing Sheets

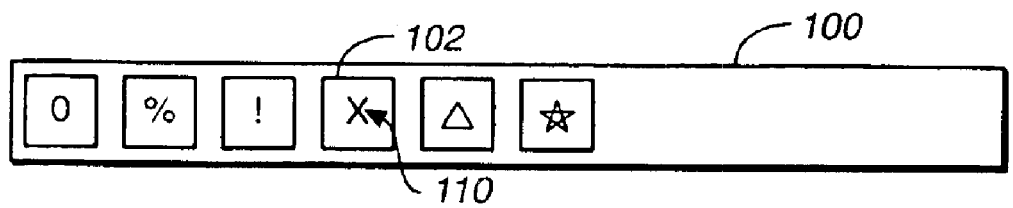
FIG._1A
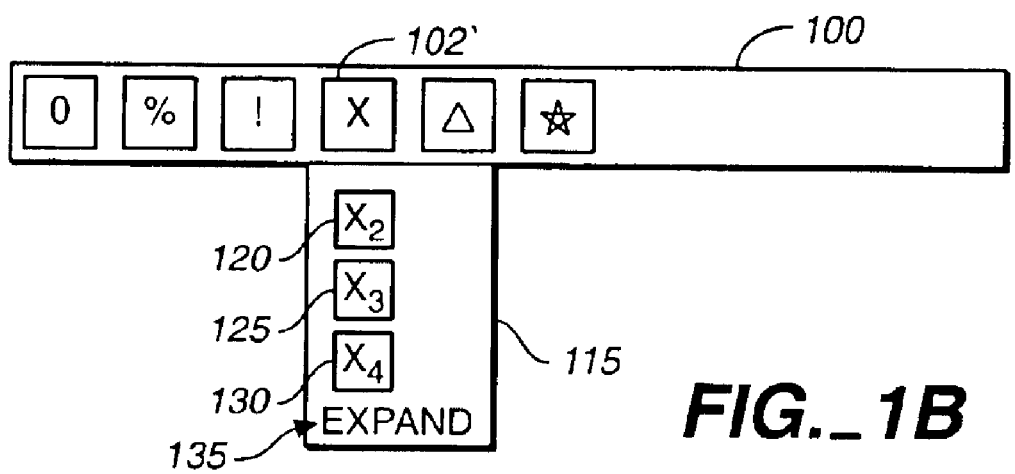
FIG._1B
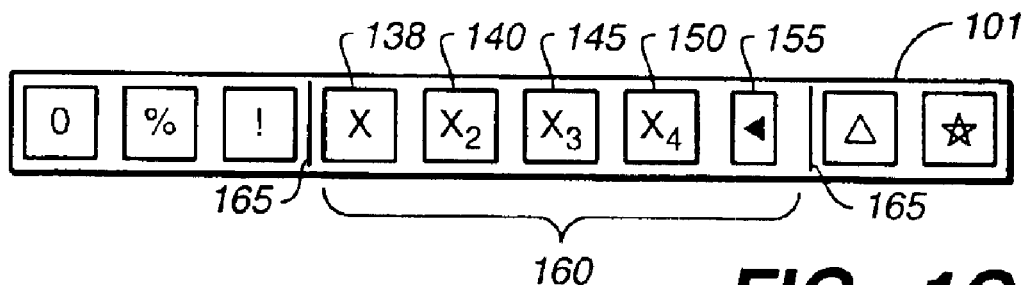
FIG._1C

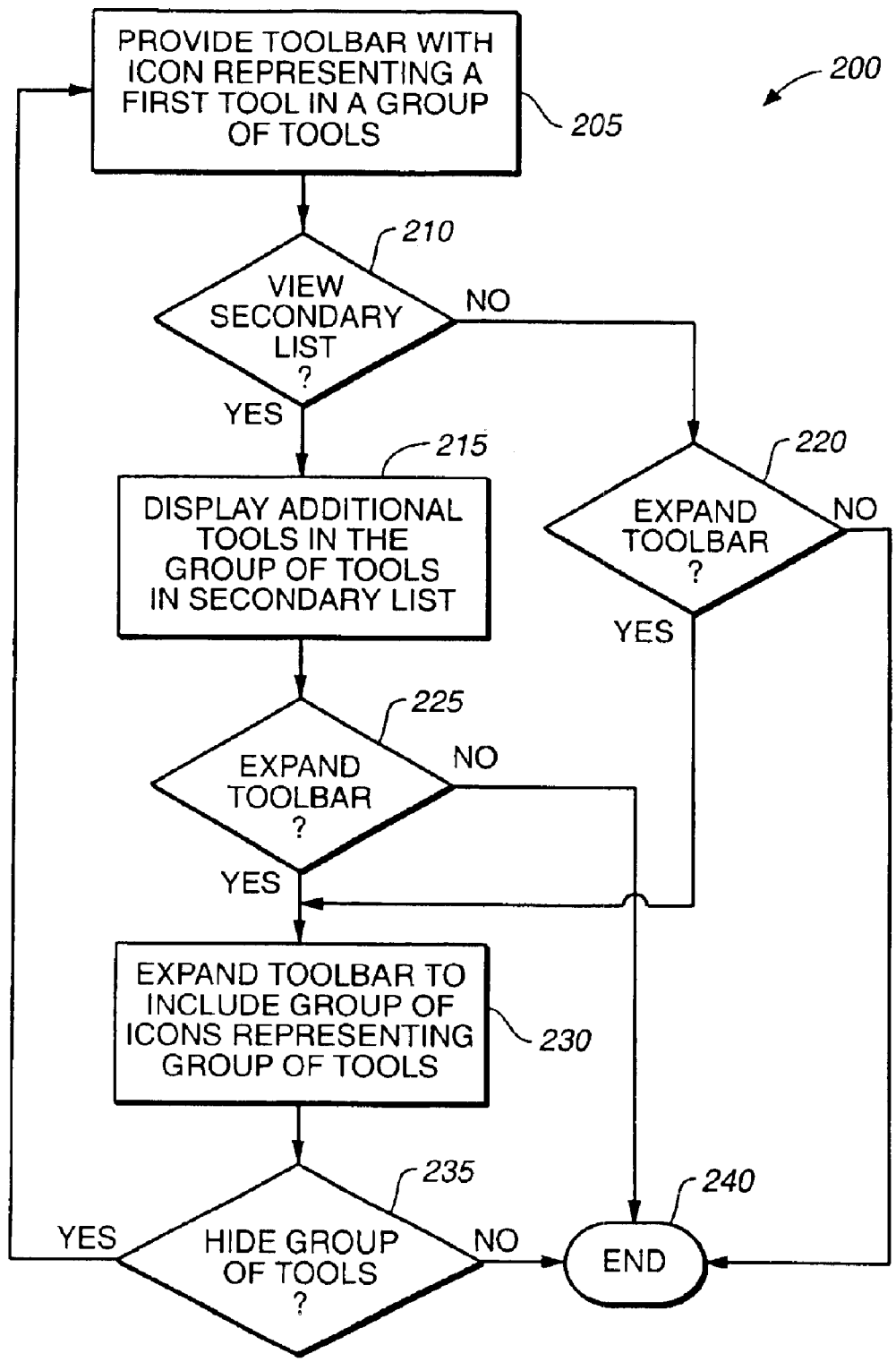
FIG._2

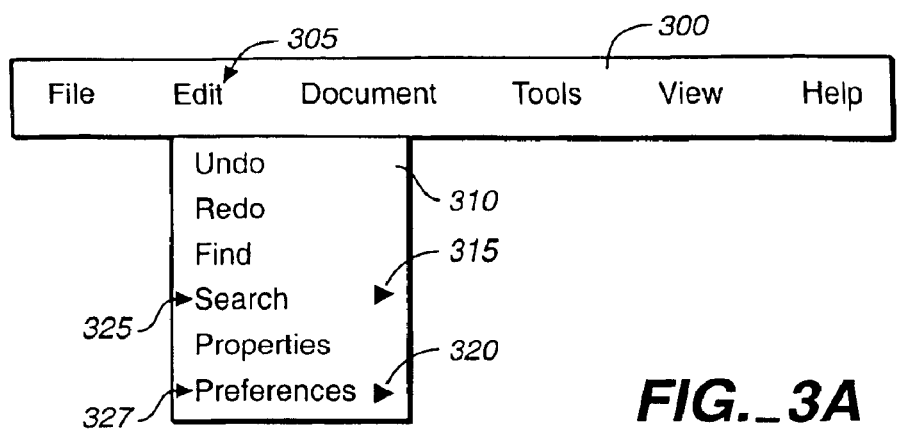
FIG._3A
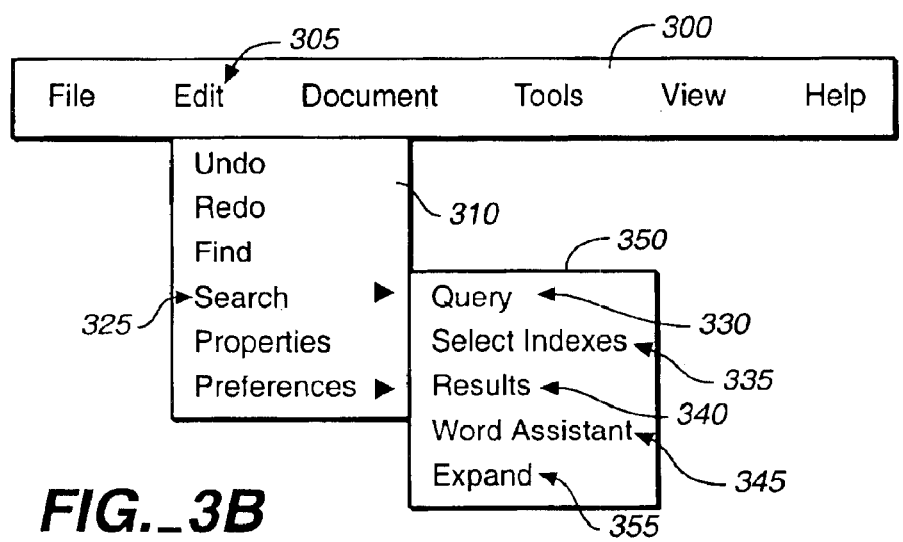
FIG._3B
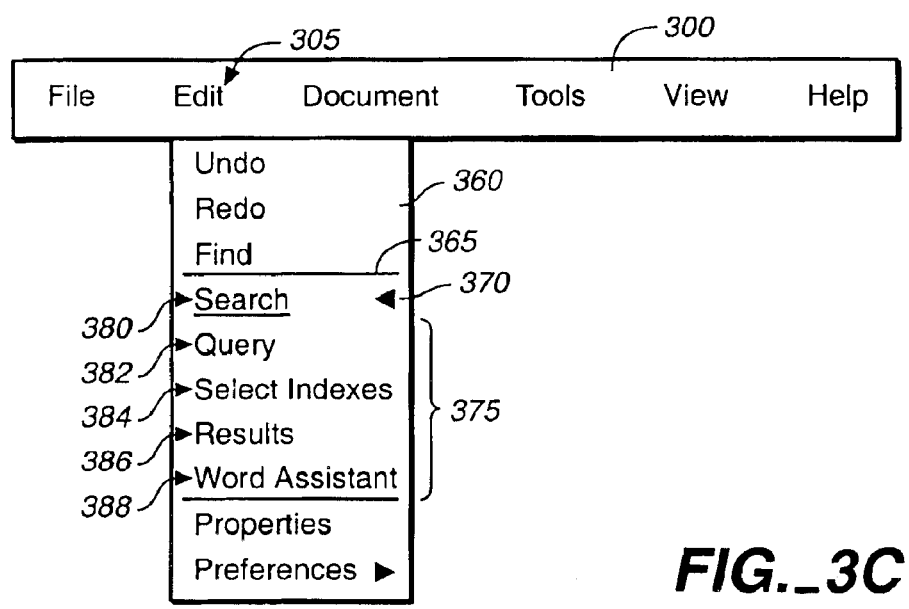
FIG._3C

METHOD AND APPARATUS FOR EXPANDING AND CONTRACTING GRAPHICAL FUNCTION DISPLAYS

BACKGROUND OF THE INVENTION

This invention relates to graphical function displays for computer program applications having a graphical user interface.

As software programs become more complex, one of the biggest issues faced by program designers is making a software program's controls easily accessible to a user within a user interface. Graphical function displays of program functions are commonly referred to as toolbars having icons representing program functions, also referred to as toolbar buttons. A number of other names are used to reference graphical function displays, including menu and tool palette. The generic term toolbar shall be used herein to refer to all types of graphical function displays, including menus and tool palettes. The term tool shall be used herein to refer to all types of program functions represented by graphical function displays. A tool represented by an icon can be accessed by a user, for example, by a mouse click on the icon, by highlighting the icon or by pressing a key or keys on a keyboard. As the number of controls accessible to a user grows, it can become impractical to display all such controls in a toolbar. To simplify the user interface and to minimize the screen real estate for the user interface elements, some applications group several tools together under a single icon. The single icon can be a split icon, whereby a user can either activate the icon to select the tool represented by the icon or the user can activate an arrow displayed on the split icon, to display a secondary list. Alternatively, the single icon may not be a split icon, but rather an icon that can be activated in a first manner to select the tool represented by the icon or activated in a second manner to display a secondary list. The secondary list, sometimes referred to as a pull-down or fly-out, includes a graphical representation of the one or more additional tools in the group of tools. The user can select any tool in the group of tools from the secondary list.

Although typically a secondary list disappears from the screen once a user selects to activate a tool or program function not contained in the secondary list, some applications permit a user to tack open a secondary list so that the tools represented on the list remain accessible after one or more of them have been selected. The secondary list continues to take up valuable screen real estate, even when not being used by a user.

Some applications permit the user to drag or tear the secondary list away from the toolbar to create a separate floating tool palette representing the tools in the group of tools contained in the list. Floating tool palettes use valuable screen space and can create a cluttered user interface that may also be confusing to a user, particularly if a tool is represented by both an icon on the toolbar and another icon on a separate floating tool palette.

SUMMARY

In general, in one aspect, the invention features methods and apparatus, including computer program products, implementing techniques for customizing a graphical function display. A toolbar graphically represents tools including one or more groups of tools, wherein a tool is represented by an icon and a group of tools is represented by one or more icons. The toolbar includes a first icon representing a first tool in a first group of tools and representing the first group of tools. In response to a first user input, an expanded toolbar is generated by expanding the toolbar to replace the first icon with a plurality of icons representing tools in the first group of tools.

Implementations can include one or more of the following. Prior to generating an expanded toolbar, in response to a second user input selecting the first icon, a secondary list is displayed. The secondary list includes one or more icons representing the tools in the first group of tools. The secondary list can be removed in response to the first user input. Where the toolbar includes other icons, generating an expanded toolbar can include removing the first icon from a position on the toolbar relative to the other icons included in the toolbar and including the plurality of icons in the same position on the toolbar relative to the other icons included in the toolbar. In response to a third user input, the expanded toolbar can be contracted to generate a contracted toolbar. The contracted toolbar can include one or more icons, but less than the plurality of icons, representing one or more tools in the first group of tools and representing the first group of tools. Expanding the toolbar can include inserting a hide icon in the expanded toolbar and the third user input can include electronic data representing an activation of the hide icon. The expanded toolbar can include one or more graphical elements distinguishing the icons representing tools in the first group of tools from other icons on the toolbar. The graphical elements can include, for example, separator lines located before and after the icons representing tools in the first group of tools on the toolbar, a contrasting color in which the icons representing tools in the first group of tools are displayed on the toolbar, or a border surrounding the icons representing tools in the first group of tools on the toolbar.

In general, in another aspect, the invention features methods and apparatus, including computer program products, implementing techniques for customizing a graphical function display. A toolbar graphically represents tools including one or more groups of tool. A tool is represented by an icon and a group of tools is represented by one or more icons. The toolbar includes a plurality of icons representing a plurality of tools in a first group of tools. In response to a user input, a contracted toolbar is generated by contracting the toolbar to replace the plurality of icons with one or more icons, but less than the plurality icons, representing one or more tools in the first group of tools and representing the first group of tools.

In general, in another aspect, the invention features methods and apparatus, including computer program products, implementing techniques for customizing a graphical function display. A toolbar graphically represents tools including one or more groups of tools. A tool is represented by an icon and a group of tools is represented by one or more icons. The toolbar includes a first icon representing a first tool in a first group of tools and representing the first group of tools. In response to a first user input selecting the first icon, a secondary list is displayed including one or more icons representing the tools in the first group of tools. In response to a second user input, an expanded toolbar is generated by expanding the toolbar to replace the first icon with a plurality of icons representing tools in the first group of tools and removing the secondary list. In response to a third user input, the expanded toolbar is contracted to generate a contracted toolbar, the contracted toolbar including one or more icons, but less than the plurality of icons, representing one or more tools in the first group of tools and representing the first group of tools.

The invention can be implemented to realize one or more of the following advantages. A graphical function display, referred to herein as a toolbar, can be expanded or contracted to either display or hide groups of tools, providing a user with easy access to a group of tools while minimizing the screen space required to display the tools and providing access to the tools in a familiar and easily accessible location for the user. A user can expand a toolbar to include a plurality of icons representing a group of tools by a single click of a mouse, allowing the user to easily display only those tools required by the user and to conserve screen space. A user can also contract a toolbar, by replacing a group of icons representing a group of tools with one or more icons representing one or more tools and representing the group of tools, with minimal effort by the user, thus allowing the user to easily adapt the user's toolbar to a current task being performed by the user.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 1A shows a toolbar including an icon graphically representing a first tool in a first group of tools.

FIG. 1B shows a secondary list associated with an icon on the toolbar of FIG. 1A, the secondary list graphically representing a group of tools.

FIG. 1C shows an expanded toolbar including a plurality of icons representing tools in the group of tools represented on the secondary list of FIG. 1B.

FIG. 2 is a flowchart showing the method for expanding and contracting a toolbar.

FIG. 3A shows a menu-type toolbar including icons representing tools in one or more groups of tools.

FIG. 3B shows a submenu associated with an icon on the toolbar of FIG. 3A, the submenu representing a group of tools.

FIG. 3C shows an expanded toolbar including a plurality of icons representing tools in the group of tools.

Like reference symbols in the various drawings indicate like elements.

DETAILED DESCRIPTION

A method for expanding and contracting graphical function displays allows a user of a graphical user interface easy access to frequently used functions, while minimizing the clutter of the user interface and the space taken up by user interface elements. The graphical function display can be expanded and contracted with a single mouse click allowing the user to toggle between different variations of one expandable and contractable graphical function display with minimal effort. In general, a graphical function display can be expanded by replacing an icon representing a group of tools, or optionally representing a first tool in a group of tools and the group of tools, with a plurality of icons representing the plurality of tools in the group of tools. Similarly, a graphical function display can be contracted by replacing a plurality of icons representing tools in a group of tools with one or more icons, but less than the plurality of icons, representing one or more tools and the group of tools. In another aspect, the plurality of icons can be replaced by a single icon representing only the group of tools.

Graphical function displays, including toolbars, tool palettes, menus and the like, shall generically be referred to as toolbars herein. Program functions, including tools, menu a, items and the like, shall generically be referred to as tools herein.

As shown in FIG. 1A–C, an example of a graphical function display is a toolbar 100. A toolbar 100 can graphically represent multiple tools represented by distinctive regions, generally referred to as icons or toolbar buttons, which can be activated by a user to access the tools. The toolbar 100 can also include one or more icons 102 representing one or more groups of tools. An icon representing a group of tools can be identified in a number of ways, for example, a split icon 102 having a pull-down indicator 110, or a single icon including a fly-out visual such as an arrow, which single icon can also represent a tool in the group of tools. A user can activate the icon 102 representing a group of tools either to access the tool represented by the icon 102, or to display a secondary list 115 including icons 120, 125, 130 graphically representing the additional tools in the group of tools.

The icon 102 on the toolbar 100 representing the group of tools can represent any one of the tools in the group of tools and can change to represent a different tool in the group of tools. For example, the representative tool can be the most recently accessed tool in the group, which could change as the user accessed the tools in the group of tools.

The secondary list 115 includes an expand icon 135. The user can activate the expand icon to cause the toolbar 100 to expand into an expanded toolbar 101 including icons 138, 140, 145, 150 representing the tools in the group of tools. The icons 138, 140, 145, 150 representing the group of tools replace the icon 102 that represented a tool and the group of tools in the original toolbar 100. Expanding the toolbar in place provides the user with access to the group of tools in a location already familiar to and easily accessible by the user. No floating tool palette or additional toolbar is added to the user interface. Expanding the toolbar also causes the secondary list 115 to disappear, freeing up screen space. The icons 138, 140, 145, 150 representing the group of tools are grouped together on the expanded toolbar 101. Graphical elements can be used to distinguish the group of icons 160 from other toolbar buttons on the expanded toolbar 101. For example, separator lines 165 can be placed before the first icon 138 in the group 160 and after the last icon 150 in the group 160 to distinguish the icons as representing a group of tools. Alternatively, icons representing a group of tools can be distinguished by other graphical elements such as distinctive colors, borders or the like.

The expanded toolbar 101 can be contracted to replace the group 160 of icons with one or more icons representing one or more tools and representing the group of tools. For example, the expanded toolbar 101 can include a hide icon 155 that the user can activate to replace the group 160 of icons with one icon representing one tool in the group and representing the group of tools. In another example, each icon 138, 140, 145, 150 representing the group of tools on the expanded toolbar 101 can have a means for removing the icon from the expanded toolbar, such as an individual hide icon associated with each icon 138, 140, 145, 150 in the group 160. The user can then select to replace some, or all but one, of the icons in the group 160 with a fewer number of icons.

The example of a graphical function display shown in FIG. 1A is a toolbar including one icon representing a group of tools. However, the method can be implemented with a toolbar having any number of icons representing any number of groups of tools. Similarly, while the examples of FIG.

1A–C provide for the expansion and contraction of the toolbar in response to user input in the form of activating an appropriate icon, those skilled in the art will recognize other ways in which the user can provide this input, for example, by "right-clicking" with a mouse in a displayed secondary list to expand the toolbar or in a displayed icon to hide the icon.

Although FIG. 1A–C depict a toolbar and a pull-down type of secondary list, the method can be implemented with any graphical function display. For example, the graphical function display can be a toolbar including an icon representing a tool and a group of tools, which group of tools can be displayed in a fly-out type of secondary list by activation of a fly-out visual on the icon by the user. The fly-out type of secondary list includes a means for the user to remove the secondary list and expand the toolbar to include icons representing the group of tools displayed on the secondary list, for example, an expand icon.

A method 200 for expanding and contracting a graphical function display is illustrated in FIG. 2 using, as an example, a toolbar capable of displaying a secondary list as the graphical function display. A user interface displays a toolbar including icons graphically representing tools and one or more icons representing one or more groups of tools (step 205). In one implementation, an icon representing a group of tools is recognizable by the user as representing a group of tools by the inclusion of a fly-out visual or other graphic on the icon. The user can activate the fly-out visual to view a secondary list ('yes' branch of step 210) that includes a graphical representation of the additional tools in the group of tools (step 215). The secondary list includes a means for the user to select to expand the toolbar to include icons representing the tools represented on the secondary list and to remove the secondary list. For example, the secondary list can include an expand icon. The user can activate the expand icon ('yes' branch of step 225) to expand the toolbar (step 230). The expanded toolbar includes icons graphically representing all of the tools in the group of tools. Alternatively, the expanded toolbar can include icons representing the original tool and one or more additional tools in the group of tools, such as a selected subset of the group of tools. The icons are grouped together to provide a distinctive visual representation to the user that the tools represented by the icons form a group. Grouped tools are typically related to one another, and therefore displaying them together as a group facilitates the user's navigation of the toolbar.

In another implementation, the user can cause the toolbar to expand without first viewing the secondary list. For example, an expand icon can be included on the toolbar as well as in the secondary list. The user can activate the expand icon directly on the toolbar ('yes' branch of step 220) to expand the toolbar to include icons representing the additional tools in the group of tools (step 230).

The user can choose to contract the toolbar to create a contracted toolbar (step 235) including fewer icons representing the group of tools (for example, a single icon representing the group of tools), by way of a fly-out visual. The expanded toolbar can include a hide icon. When the hide icon is activated by the user, the group of icons is replaced by one icon to form a contracted toolbar (step 205). The user can then choose to view the secondary list, expand the toolbar or leave the toolbar in a contracted state.

In another implementation, the graphical function display is a menu-type toolbar displaying icons or menu items representing program functions. The menu-type toolbar 310 shown in FIGS. 3A–C is associated with the EDIT command 305 represented on a toolbar 300. The toolbar 310 includes icons representing a number of program functions or tools, including one or more tools representing one or more groups of tools. For example, the SEARCH tool and the PREFERENCES tool each represent a group of tools as indicated by the sub-menu indicators 315, 320 associated with the icons 325, 327 representing the SEARCH and PREFERENCES tools. A user can activate the icon 325 representing the SEARCH tool to view the sub-menu 350 associated with the SEARCH tool.

The sub-menu 350 displays a representation of the tools 330, 335, 340, 345 in the group of tools represented by the SEARCH icon 325. The user can access any of the tools in the group by selecting the associated icon from the sub-menu 350. The user can also select to expand the toolbar 310 to include graphical representations of the group of tools in the sub-menu 350. In one implementation, the sub-menu 350 includes an expand icon 355 that the user can activate to expand the toolbar 310. Activating the expand icon 355 causes the sub-menu 350 to disappear and the toolbar 310 to expand into an expanded toolbar 360. The expanded toolbar 360 includes icons 382, 384, 386, 388 representing the tools in the group 375 of tools. The icons 382, 384, 386, 388 representing the group of tools replace icon 325 that represented the group of tools in the original toolbar 310. Expanding the toolbar in place provides the user access to the icons in a familiar and easily accessible location. Removal of the sub-menu 350 upon expansion of the toolbar 310 frees up valuable screen space.

The group 375 can be distinguished from other icons on the expanded toolbar 360, for example, by including separator lines 365 and, optionally, a label, such as the word "SEARCH" 380, to identify the group of tools, located above the first icon 382 and below the last icon 388 in the group 375. A label can also include, for example, more than one word, a symbol or symbols or a combination of more than one words and symbols.

The expanded toolbar 360 can be contracted to replace the group 375 with an icon representing the group of tools. For example, the expanded toolbar 360 can include a hide icon 370 that the user can activate to replace the group 375 with one icon, such as the SEARCH icon, representing the group of tools. In another example, each icon 382, 384, 386, 388 representing the group of tools on the expanded toolbar 360 can have a means for removing the icon from the expanded toolbar 360, such as an individual hide icon associated with each icon 382, 384, 386, 388. The user can then select to replace some, or all but one, of the icons in the group 375 with a fewer number of icons.

The method provides a way of expanding and contracting a graphical function display without adding more graphical function displays to the user interface and by keeping a group of tools in one location for easy access by a user.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; a magneto-optical disks; and optical disks. Storage devices suitable for tangibly embodying computer program instructions; and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular embodiments. Other embodiments are within the scope of the following claims. For example, the steps of the invention can be performed in a different order and still achieve desirable results.

What is claimed is:

1. A computer-implemented graphical user interface method, comprising: providing a toolbar graphically representing one or more tools including one or more groups of tools, wherein a tool is represented by an icon and wherein a group of tools is represented by one or more icons, the toolbar including a first icon representing a first group of tools; and in response to a first user input, generating an expanded toolbar by expanding the toolbar to replace the first icon with a plurality of icons representing tools in the first group of tools; wherein the toolbar includes other icons and wherein generating an expanded toolbar to replace the first icon with a plurality of icons representing tools in the first group of tools comprises: removing the first icon from a position on the toolbar relative to the other icons included in the toolbar and including the plurality of icons in the same position on the toolbar relative to the other icons included in the toolbar.

2. The method of claim 1, wherein the first icon represents both the first group of tools and a first tool in the first group of tools.

3. The method of claim 1, further comprising: prior to generating an expanded toolbar, in response to a second user input selecting the first icon, displaying a secondary list including one or more icons representing the tools in the first group of tools.

4. The method of claim 3, further comprising: removing the secondary list in response to the first user input.

5. The method of claim 1, further comprising: in response to a third user input, contracting the expanded toolbar to generate a contracted toolbar, the contracted toolbar including one or more icons, but less than the plurality of icons, representing one or more tools in the first group of tools and representing the first group of tools.

6. The method of claim 5, wherein: the contracted toolbar includes only one icon representing both the first group of tools and a tool in the first group of tools.

7. The method of claim 5, wherein: the contracted toolbar includes a single icon representing only the first group of tools.

8. The method of claim 5, wherein: expanding the toolbar includes inserting a hide icon in the expanded toolbar; and the third user input includes electronic data representing an activation of the hide icon.

9. The method of claim 1, wherein: the expanded toolbar includes one or more graphical elements distinguishing the icons representing tools in the first group of tools from other icons on the toolbar.

10. The method of claim 9, wherein: the one or more graphical elements include separator lines located before and after the icons representing tools in the first group of tools the toolbar.

11. The method of claim 9, wherein: the one or more graphical elements include a contrasting color in which the icons representing tools in the first group of tools are displayed on the toolbar.

12. The method of claim 9, wherein: the one or more graphical elements include a border surrounding the icons representing tools in the first group of tools on the toolbar.

13. The method of claim 9, wherein: the one or more graphical elements includes a label identifying the first group of tools.

14. A computer-implemented graphical user interface method, comprising: providing a toolbar graphically representing one or more tools including one or more groups of tool, wherein a tool is represented by an icon and wherein a group of tools is represented by one or more icons, the toolbar including a plurality of icons representing a plurality of tools in a first group of tools; and in response to a user input, generating a contracted toolbar by contracting the toolbar to replace the plurality of icons with one or more icons, but less than the plurality of icons, wherein the toolbar includes other icons and wherein contracting the toolbar to replace the plurality of icons with one or more icons, but less than the plurality of icons comprises: removing the plurality of icons from a position on the toolbar relative to the other icons included in the toolbar and including the one or more icons in the same position on the toolbar relative to the other icons included in the toolbar.

15. The method of claim 14, wherein: the contracted toolbar includes only one icon representing both a tool in the first group of tools and the first group of tools.

16. The method of claim 14, wherein: the contracted toolbar includes a single icon representing only the first group of tools.

17. The method of claim 14, wherein: the contracted toolbar includes a hide icon; and the user input includes electronic data representing an activation of the hide icon.

18. A computer-implemented graphical user interface method, comprising: providing a toolbar graphically representing one or more tools including one or more groups of tools, wherein a tool is represented by an icon and wherein a group of tools is represented by one or more icons, the toolbar including a first icon representing a first tool in a first group of tools and representing the first group of tools; in response to a first user input selecting the first icon, displaying a secondary list including one or more icons representing the tools in the first group of tools; in response to a second user input, generating an expanded toolbar by expanding the toolbar to replace the first icon with a plurality of icons representing tools in the first group of tools and removing the secondary list; and in response to a third user input, contracting the expanded toolbar to generate a contracted toolbar, the contracted toolbar including one or more icons, but less than the plurality of icons, representing one or more tools in the first group of tools and representing the first group of tools.

19. The method of claim 18, wherein: expanding the toolbar includes inserting a hide icon in the expanded toolbar, and the third user input includes electronic data representing an activation of the hide icon.

20. The method of claim 18, wherein: the expanded toolbar includes one or more graphical elements distinguishing the icons representing tools in the first group of tools from other icons on the toolbar.

21. A computer program product, tangibly stored on a machine-readable medium, comprising instructions operable to cause a programmable processor to; provide a toolbar graphically representing one or more tools including one or more groups of tools, wherein a tool is represented by an icon and wherein a group of tools is represented by one or more icons, the toolbar including a first icon representing a first tool in a first group of tools and representing the first group of tools; and in response to a first user input, generate an expanded toolbar by expanding the toolbar to replace the first icon with a plurality of icons representing tools in the first group of tools;

wherein the toolbar includes other icons and wherein instructions operable to generate an expanded toolbar to replace the first icon with a plurality of icons representing tools in the first group of tools comprise instructions operable to:

remove the first icon from a position on the toolbar relative to the other icons included in the toolbar and include the plurality of icons in the same position on the toolbar relative to the other icons included in the toolbar.

22. The computer program product of claim 21, wherein the first icon represents both the first group of tools and a first tool in the first group of tools.

23. The computer program product of claim 21, further comprising instructions operable to: prior to generating an expanded toolbar, in response to a second user input selecting the first icon, display a secondary list including one or more icons representing the tools in the first group of tools.

24. The computer program product of claim 23, further comprising instructions operable to: remove the secondary list in response to the first user input.

25. The computer program product of claim 21, further comprising instructions operable to: in response to a third user input, contract the expanded toolbar to generate a contracted toolbar, the contracted toolbar including one or more icons, but less than the plurality of icons, representing one or more tools in the first group of tools and representing the first group of tools.

26. The computer program product of claim 25, wherein: the contracted toolbar includes only one icon representing both the first group of tools and a tool in the first group of tools.

27. The computer program product of claim 25, wherein: the contracted toolbar includes a single icon representing only the first group of tools.

28. The computer program product of claim 25, wherein: instructions operable to expand the toolbar include instructions operable to insert a hide icon in the expanded toolbar; and the third user input includes electronic data representing an activation of the hide icon.

29. The computer program product of claim 21, wherein: the expanded toolbar includes one or more graphical elements distinguishing the icons representing tools in the first group of tools from other icons on the toolbar.

30. The computer program product of claim 29, wherein: the one or more graphical elements include separator lines located before and after the icons representing tools in the first group of tools on the toolbar.

31. The computer program product of claim 29, wherein: the one or more graphical elements include a contrasting color in which the icons representing tools in the first group of tools are displayed on the toolbar.

32. The computer program product of claim 29, wherein: the one or more graphical elements include a border surrounding the icons representing tools in the first group of tools on the toolbar.

33. The computer program product of claim 29, wherein: the one or more graphical elements includes a label identifying the first group of tools.

34. A computer program product, tangibly stored on a machine-readable medium, comprising instructions operable to cause a programmable processor to: provide a toolbar graphically representing one or more tools including one or more groups of tool, wherein a tool is represented by an icon and wherein a group of tools is represented by one or more icons, the toolbar including a plurality of icons representing a plurality of tools in a first group of tools; and in response to a user input, generate a contracted toolbar by contracting the toolbar to replace the plurality of icons with one or more icons, but less than the plurality icons, wherein the toolbar includes other icons and wherein contracting the toolbar to replace the plurality of icons with one or more icons, but less than the plurality of icons comprises: removing the plurality of icons from a position on the toolbar relative to the other icons included in the toolbar and including the one or more icons in the same position on the toolbar relative to the other icons included in the toolbar.

35. The computer program product of claim 34, wherein: the contracted toolbar includes only one icon representing both the first group of tools and a tool in the first group of tools.

36. The computer program product of claim 34, wherein: the contracted toolbar includes a single icon representing only the first group of tools.

37. The computer program product of claim 34, wherein: the contracted toolbar includes a hide icon; and the user input includes electronic data representing an activation of the hide icon.

38. A computer program product, tangibly stored on a machine-readable medium, comprising instructions operable to cause a programmable processor to: provide a toolbar graphically representing one or more tools including one or more groups of tools, wherein a tool is represented by an icon and wherein a group of tools is represented by one or more icons, the toolbar including a first icon representing a first tool in a first group of tools and representing the first group of tools; in response to a first user input selecting the first icon, display a secondary list including one or more icons representing the tools in the first group of tools; in response to a second user input, generate an expanded toolbar by expanding the toolbar to replace the first icon with a plurality of icons representing tools in the first group of tools and remove the secondary list; and in response to a third user input, contract the expanded toolbar to generate a contracted toolbar, the contracted toolbar including one or more icons, but less than the plurality of icons, representing one or more tools in the first group of tools and representing the first group of tools.

39. The computer program product of claim 38, wherein: instructions operable to expand the toolbar include instructions operable to insert a hide icon in the expanded toolbar; and the third user input includes electronic data representing an activation of the hide icon.

40. The computer program product of claim 38, wherein: the expanded toolbar includes one or more graphical elements distinguishing the icons representing tools in the first group of tools from other icons on the toolbar.

* * * * *